United States Patent
O'Neil et al.

(10) Patent No.: US 7,388,590 B2
(45) Date of Patent: Jun. 17, 2008

(54) METHOD AND SYSTEM FOR USING A COLOR SCHEME TO COMMUNICATE INFORMATION RELATED TO THE INTEGRATION OF HARDWARE AND SOFTWARE IN A COMPUTING DEVICE

(75) Inventors: Daniel G. O'Neil, Seattle, WA (US); David W. Flynt, Lake Forest Park, WA (US); Christen E. Coomer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/788,989

(22) Filed: Feb. 27, 2004

(65) Prior Publication Data

US 2005/0190196 A1 Sep. 1, 2005

(51) Int. Cl.
G09G 5/02 (2006.01)
H04B 1/38 (2006.01)
H04M 1/00 (2006.01)

(52) U.S. Cl. .................. 345/589; 345/593; 455/567

(58) Field of Classification Search ................. 345/581, 345/589, 593, 594, 595; 455/564, 566, 567, 455/565
See application file for complete search history.

(56) References Cited

U.S. PATENT DOCUMENTS

| | | | | |
|---|---|---|---|---|
| 5,425,077 A * | 6/1995 | Tsoi | ............................ | 455/566 |
| 5,737,394 A * | 4/1998 | Anderson et al. | ........ | 379/88.11 |
| 5,905,493 A * | 5/1999 | Belzer et al. | ................. | 715/835 |
| 6,094,565 A * | 7/2000 | Alberth et al. | ............ | 455/575.3 |
| 6,690,955 B1 * | 2/2004 | Komiyama | .................. | 455/566 |
| 6,762,740 B1 * | 7/2004 | Kimura | ....................... | 345/102 |
| 7,151,953 B2 * | 12/2006 | Hamada et al. | ............. | 455/567 |
| 7,203,522 B2 * | 4/2007 | Hama et al. | .................. | 455/566 |
| 2002/0019248 A1 * | 2/2002 | Ruck | ........................... | 455/566 |
| 2002/0024505 A1 * | 2/2002 | Eftekhari | ..................... | 345/169 |
| 2002/0045465 A1 * | 4/2002 | Kishida et al. | .............. | 455/566 |
| 2002/0147976 A1 * | 10/2002 | Yuen et al. | ..................... | 725/40 |
| 2002/0158915 A1 * | 10/2002 | Rowell et al. | ............... | 345/835 |
| 2002/0183098 A1 * | 12/2002 | Lee et al. | ..................... | 455/566 |
| 2002/0198931 A1 * | 12/2002 | Murren et al. | .............. | 709/203 |
| 2003/0018724 A1 * | 1/2003 | Mathewson et al. | ......... | 709/206 |
| 2003/0164862 A1 * | 9/2003 | Cadiz et al. | .................. | 345/838 |
| 2003/0210221 A1 * | 11/2003 | Aleksic | ....................... | 345/102 |
| 2003/0214655 A1 * | 11/2003 | Weiss et al. | .................. | 356/402 |
| 2004/0072589 A1 * | 4/2004 | Hamamura et al. | ....... | 455/550.1 |
| 2004/0198455 A1 * | 10/2004 | Deeds | ........................ | 455/566 |
| 2004/0204125 A1 * | 10/2004 | Messel et al. | ............... | 455/566 |
| 2004/0253976 A1 * | 12/2004 | Lin | .......................... | 455/550.1 |

* cited by examiner

*Primary Examiner*—Ulka Chauhan
*Assistant Examiner*—Dan Washburn
(74) *Attorney, Agent, or Firm*—Merchant & Gould P.C.; Ryan T. Grace

(57) ABSTRACT

A method and system for using a color scheme to communicate information associated with an event and related to the integration of software and hardware of a computing device creates a seamless user experience. A hardware element of the computing device is illuminated based on a color scheme associated with a corresponding software element. The color scheme may communicate information related to a functional feature of the computing device, personal preferences or brand extension.

21 Claims, 7 Drawing Sheets

METHOD AND SYSTEM FOR USING A COLOR SCHEME TO COMMUNICATE INFORMATION RELATED TO THE INTEGRATION OF HARDWARE AND SOFTWARE IN A COMPUTING DEVICE

BACKGROUND OF THE INVENTION

Mobile communication devices include both software and hardware elements. A display may be used as a user interface to show software elements associated with the device. The user manipulates hardware elements of the device (e.g., a keypad) to enter data, execute commands, or otherwise interact with the software elements displayed on the user interface. Currently, the hardware and software elements of a mobile device are not fully integrated to present a unified experience with the device. What is required is the full integration of hardware and software to create a seamless mobile user experience.

SUMMARY OF THE INVENTION

The present invention is directed to a method and system for using a color scheme to communicate information related to the integration of hardware and software of a computing device. A hardware element of the computing device is illuminated based on a color scheme associated with a corresponding software element. The color scheme may communicate information related to a functional feature of the computing device, personal preferences or brand extension.

In one aspect of the invention, an event is received at a computing device. The event corresponds to a software element that has an associated color scheme. A color value associated with the event notification is determined. The color value corresponds to the color scheme of the software element. A hardware element is illuminated according to the color scheme or the color value.

In another aspect of the invention, the system includes a memory of a computing device, an illuminating element coupled to the memory, and a hardware element coupled to the illuminating element. The memory receives an event. The event corresponds to a software element that has an associated color scheme. The illuminating element illuminates the hardware element according to the color scheme when the event is received.

DETAILED DESCRIPTION OF THE PREFERRED EMBODIMENT

Briefly stated, the present invention is directed to a method and system for using a color scheme to communicate information associated with an event and related to the integration of software and hardware of a computing device. A hardware element of the computing device is illuminated based on a color scheme associated with a corresponding software element. The color scheme may communicate information related to a functional feature of the computing device, personal preferences or brand extension.

Illustrative Operating Environment

Figure 1:
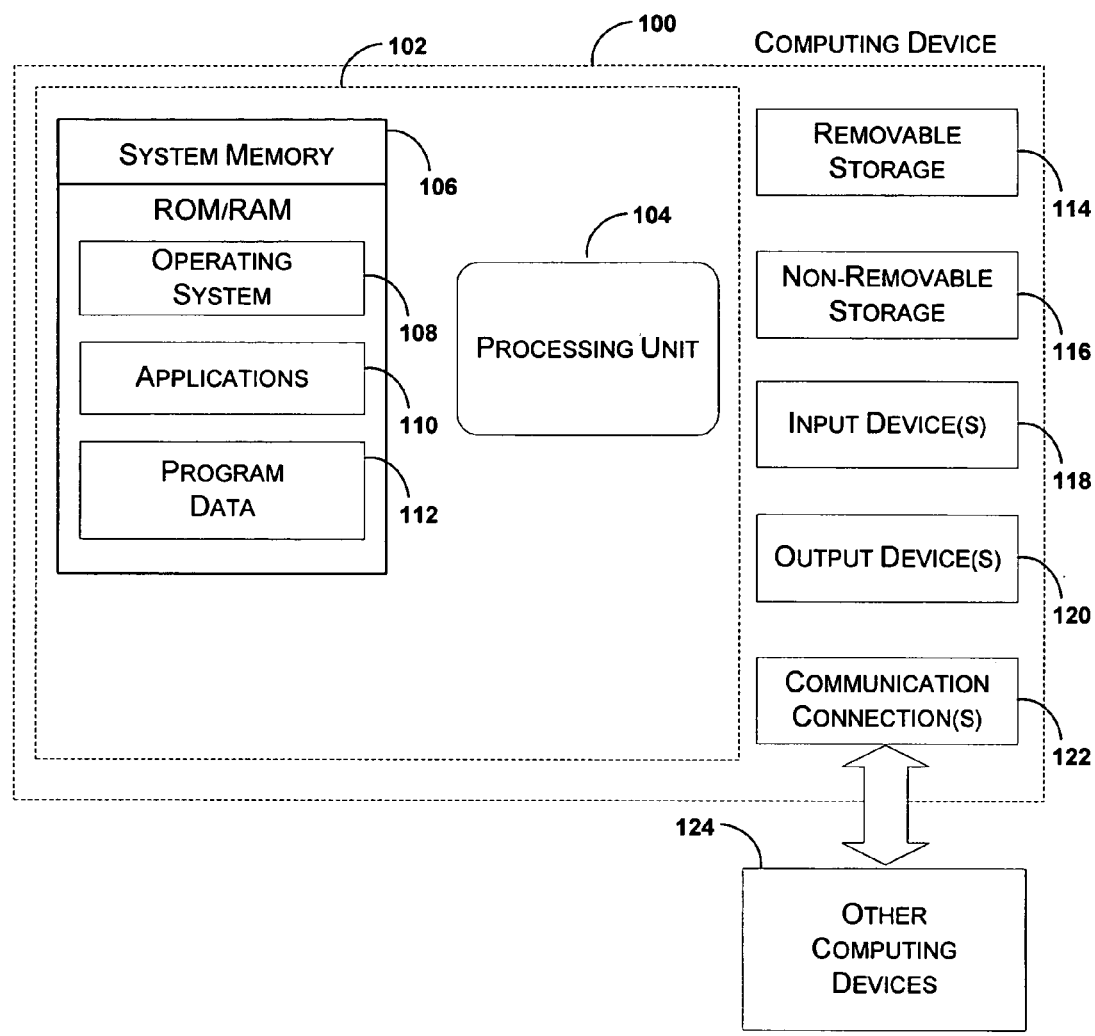
FIG. 1 shows an example computing environment in which the present invention may be implemented.

With reference to FIG. 1, an example system for implementing the invention includes a computing device, such as computing device 100. A basic configuration includes those components within dashed line 102. In the basic configuration, computing device 100 typically includes at least one processing unit 104 and system memory 106. Depending on the exact configuration and type of computing device, system memory 106 may be volatile (such as RAM), non-volatile (such as ROM, flash memory, etc.) or some combination of the two. System memory 106 typically includes an operating system 108, one or more applications 110, and may include program data 112.

Computing device 100 may have additional features or functionality. For example, computing device 100 may also include additional data storage devices (removable and/or non-removable) such as, for example, magnetic disks, optical disks, or a memory stick. Such additional storage is illustrated in FIG. 1 by removable storage 114 and non-removable storage 116. Computer storage media may include volatile and non-volatile, removable and non-removable media implemented in any method or technology for storage of information, such as computer readable instructions, data structures, program modules, or other data. System memory 106, removable storage 114 and non-removable storage 116 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 118 such as keyboard, mouse, pen, voice input device, touch input device, etc. Output device(s) 120 such as a display, speakers, printer, etc. may also be included. These devices are well know in the art and need not be discussed at length here.

Computing device 100 may also contain communication connections 122 that allow the device to communicate with other computing devices 124, such as over a network. Communication connection 122 is one example of communication media. Communication media may typically be embodied by computer readable instructions, data structures, program modules, or other data in a modulated data signal, such as a carrier wave or other transport mechanism, and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
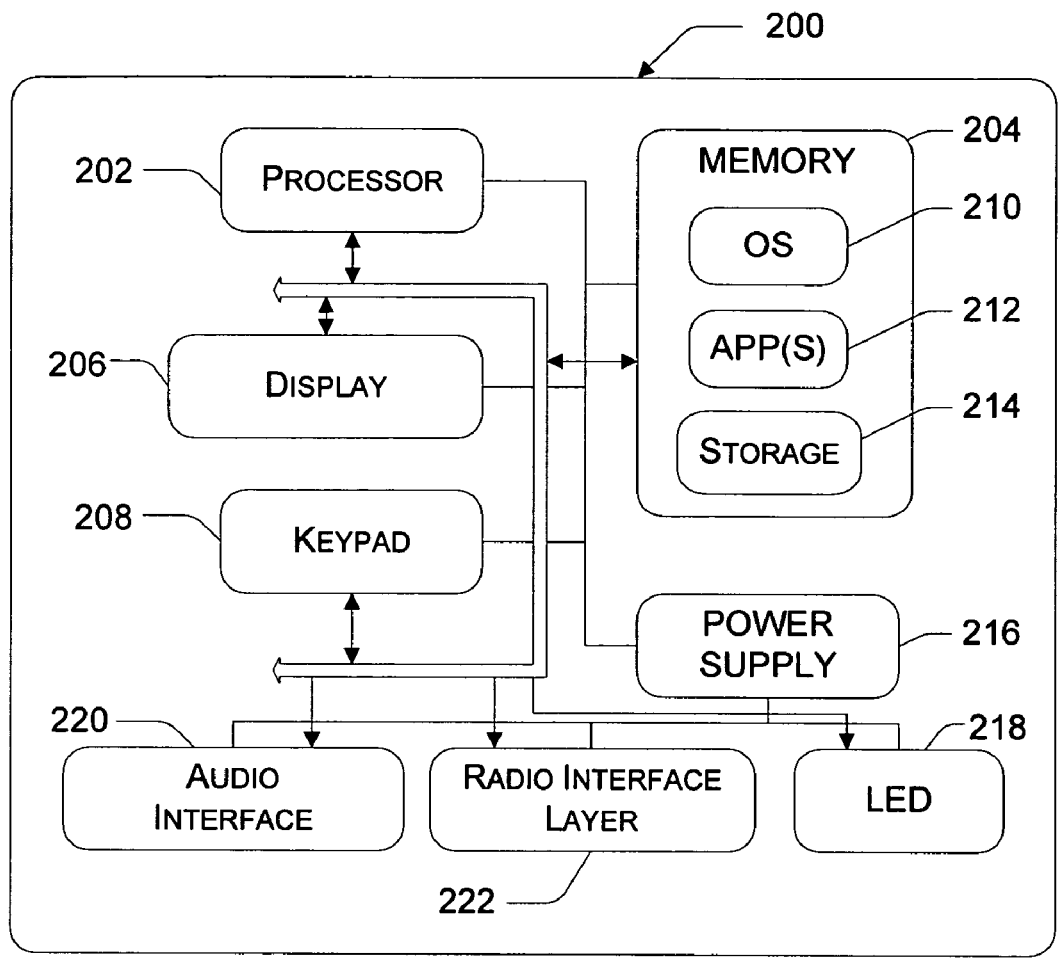
FIG. 2 is a functional block diagram illustrating an embodiment of an example communications device for practicing the present invention.

FIG. 2 is a functional block diagram illustrating an embodiment of an example communications device for practicing the present invention. In one embodiment of the present invention communications device 200 is implemented as a mobile communications device, such as a personal digital assistant (PDA), smart phone, and the like. Communications device 200 may also include handheld computers, tablet computers, personal computers, multiprocessor systems, microprocessor-based or programmable consumer electronics, network PCs, wearable computers, and the like.

Communications device 200 may include many more components than those shown in FIG. 2. The components shown, however, are sufficient to disclose an illustrative embodiment for practicing the invention.

As shown in the figure, communications device 200 includes processor 202, memory 204, display 206, and keypad 208. Memory 204 generally includes both volatile memory (e.g., RAM) and non-volatile memory (e.g., ROM, Flash Memory, or the like). Communications device 200 includes operating system 210, such as the Windows CE operating system from Microsoft Corporation or other such operating system, which is resident in memory 204 and executes on processor 202. Keypad 208 may be a push button numeric dialing pad (such as on a typical telephone), or a multi-key keyboard (such as a conventional keyboard). Display 206 may be a liquid crystal display, or any other type of display commonly used in mobile communications devices. For example, display 206 may be touch-sensitive, and would then also act as an input device enabling entry of FE language strokes.

One or more application programs 212 are loaded into memory 204 and run on operating system 210. Examples of application programs include phone dialer programs, content manager, email programs, scheduling programs, word processing programs, spreadsheet programs, smart filter, and so forth. Communications device 200 also includes non-volatile storage 214 within memory 204. Non-volatile storage 214 may be used to store persistent information which should not be lost if the communications device 200 is powered down. The application programs 212 may use and store information in storage 214, such as e-mail or other messages used by an e-mail application, contact information, databases, and the like, used by the content manager, appointment information used by a scheduling program, documents used by a word processing application, and the like. A synchronization application may also reside on communications device 200 and is programmed to interact with a corresponding synchronization application resident on a host computer to keep the information stored in storage 214 synchronized with corresponding information stored at the host computer.

Communications device 200 also includes power supply 216, which may be implemented as one or more batteries. Power supply 216 might further include an external power source, such as an AC adapter or a powered docking cradle that supplements or recharges the batteries.

Communications device 100 is also shown with two types of external notification mechanisms: LED 218 and audio interface 220. These devices may be directly coupled to power supply 216 so that when activated, they remain on for a duration dictated by the notification mechanism even though processor 202 and other components might shut down to conserve battery power. LED 218 may be programmed to remain on indefinitely until the user takes action to indicate the powered-on status of the device. Audio interface 220 is used to provide audible signals to and receive audible signals from the user. For example, audio interface 220 may be coupled to a speaker for providing audible output and to a microphone for receiving audible input, such as to facilitate a telephone conversation.

Communications device 200 also includes radio interface layer 222 that performs the function of transmitting and receiving radio frequency communications. Radio interface layer 222 facilitates wireless connectivity between communications device 200 and the outside world, via a communications carrier or service provider. Transmissions to and from radio interface layer 222 are conducted under control of operating system 210. In other words, communications received by radio interface layer 222 may be disseminated to application programs 212 via operating system 210, and vice versa.

Radio interface layer 222 allows communications device 200 to communicate with other computing devices, such as over a network. Radio interface layer 222 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Color Scheme Integration

Some information associated with a computing device application may be gleaned by merely observing the color illuminated on the computing device. In the present invention, a color scheme associated with software elements of the computing device (e.g., a color shown on the display) is also used to illuminate corresponding hardware elements (e.g., a hardware button on the keypad.) In one example, the color illuminated on the hardware element matches the color of the software element shown on the display. In another example, the same color scheme, or set of colors (e.g., colors symbolizing a sports team), is used to illuminate both the hardware elements and the software elements of the mobile device. The hardware element may include any component associated with a mobile device that is configured to be illuminated such as a keypad, a software-defined soft key, a fascia, a lens, an antenna, an accessory, or other elements. The color may communicate information about a functional feature associated with a mobile device, as well as personal preferences and brand extension.

Figure 3:
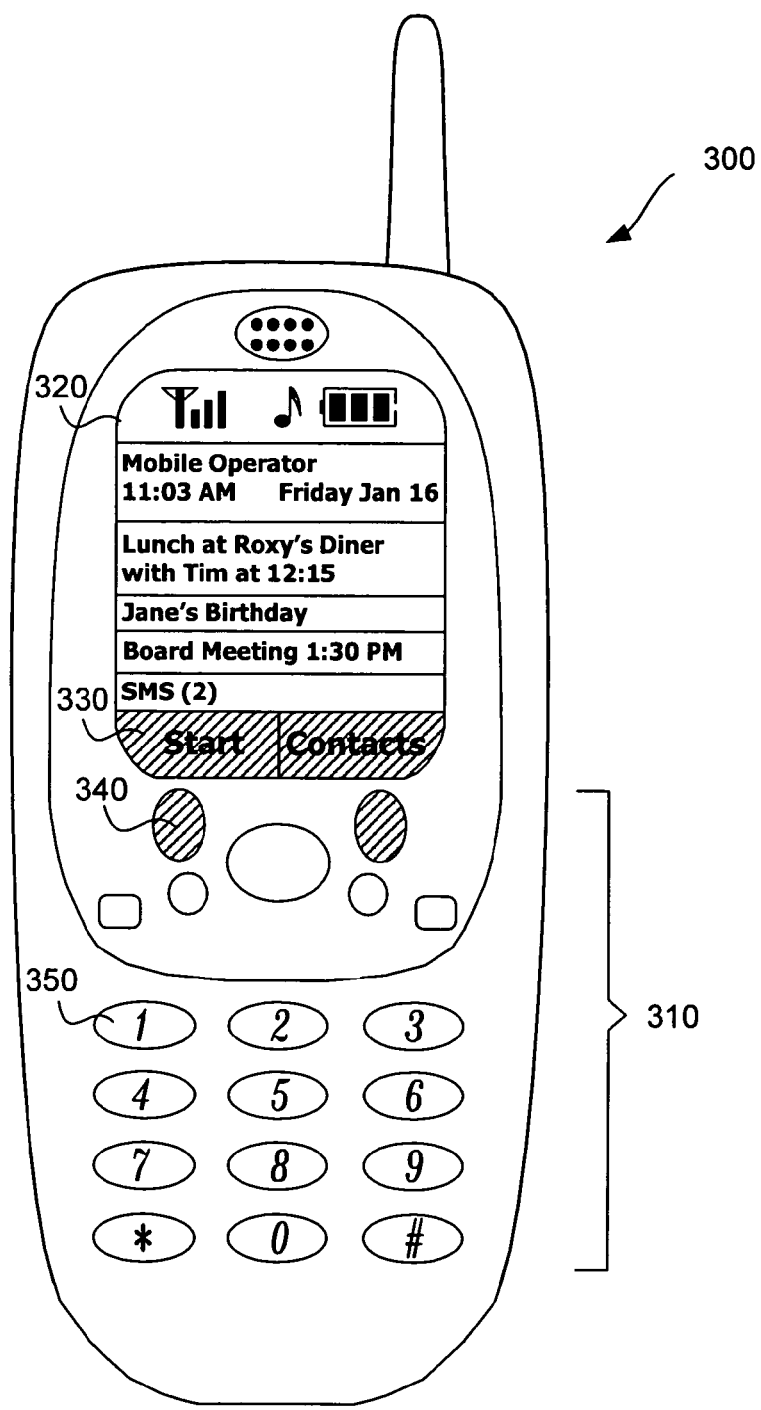
FIG. 3 illustrates an embodiment of an example mobile communication device for using a color scheme to communicate device functionality, in accordance with the present invention.

FIG. 3 illustrates an embodiment of an example mobile communication device for using a color scheme to communicate information related to device functionality. Device 300 includes keypad 310 and display 320. Display 320 includes soft keys 330. Keypad 310 includes hardware buttons 340, 350.

Soft keys 330 are software assignable keys (i.e., the software of the mobile device determines the function of a soft key.) Display 320 informs the user of the function associated with soft key 330 such that the user knows which function will be executed when hardware button 340 is depressed. For example, soft key 330 is programmed to execute a start function. The word "Start" is shown on display 320 proximate hardware button 340. Thus, the start function executes when hardware button 340 is depressed.

The functionality of device 300 may be communicated to a user by matching the color scheme of software elements on display 320 and corresponding hardware buttons 340, 350. For example, hardware button 340 and soft key 330 are illuminated to project the same color (as indicated by the diagonal line pattern) to communicate the connection between the functionality associated with the two elements. Virtually any color scheme may be achieved by illuminating software and hardware elements using tri-colored (e.g., red, green and blue (RGB)) light emitting diodes (LEDs) or electro-luminescence (EL) lighting.

A change in the color scheme associated with software elements in display 320 may result in a change in the color scheme of corresponding hardware elements. For example, if the color of soft key 330 changes, then corresponding hardware button 340 also adjusts to the same color. Likewise, if the user changes the color of display 320 via a hue shift, the color of hardware buttons 340, 350 related to software elements of display 320 also adjusts accordingly.

Figure 4:
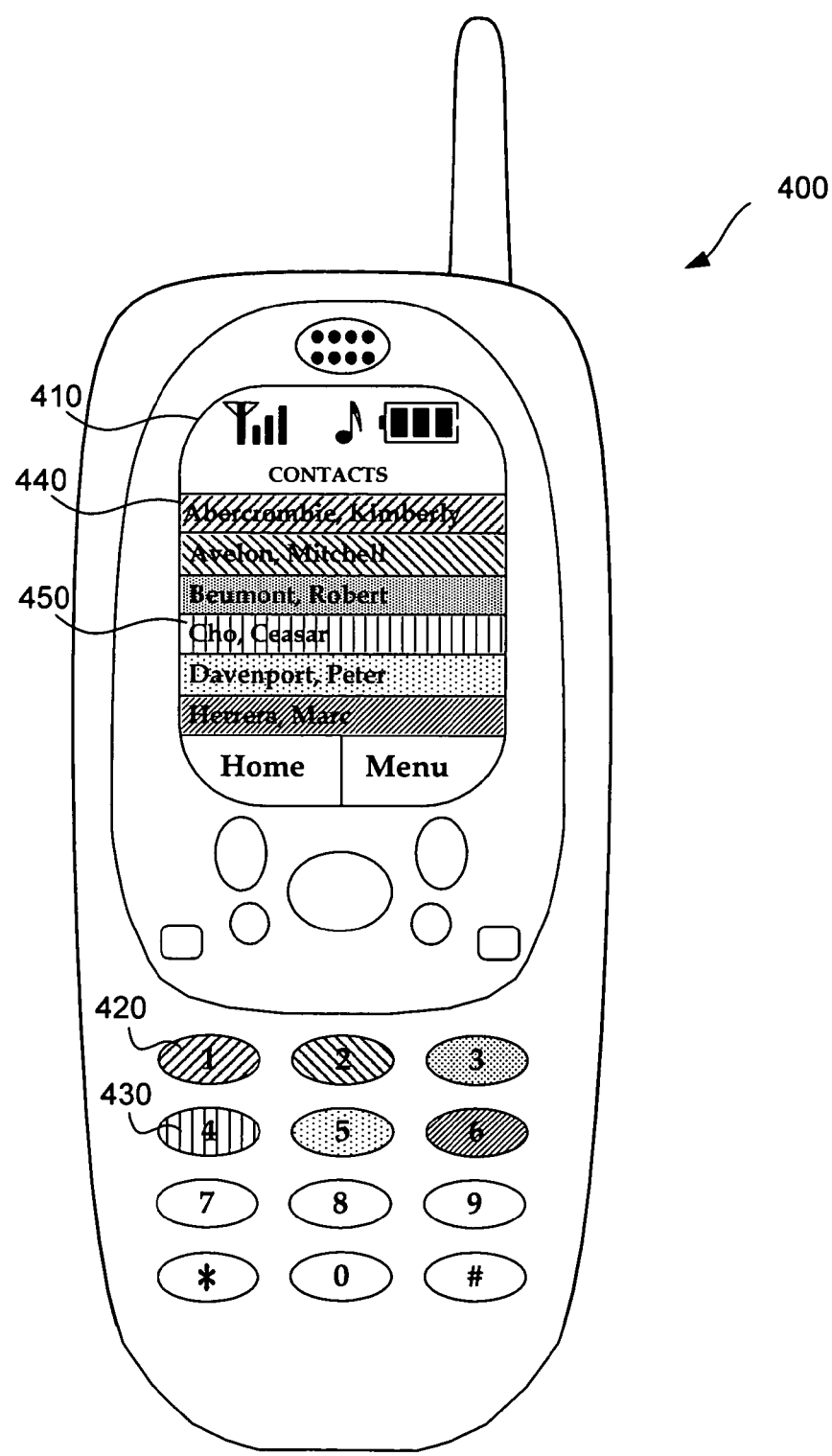
FIG. 4 illustrates an embodiment of an example mobile communication device for using a color scheme color to communicate user-specified personalization features of the device, in accordance with the present invention.

Personalization of the color associated with the integration of computing device hardware and software may reflect a user's personal tastes and aspirations. FIG. 4 illustrates an embodiment of an example mobile communication device using a color scheme to communicate information related to user-specified personalization features. Mobile device 400 includes display 410 and hardware buttons 420, 430. Display 410 provides a user interface and includes software elements such as contact list entries 440, 450.

The software elements are illuminated with a color scheme that provide a link to hardware elements. For example, a user may assign specific colors to each contact list entry 440, 450 and corresponding hardware buttons 420, 430 to communicate information related the integration of hardware and software elements of a speed dial application. In one embodiment, the functionality of the speed dial application may be communicated by matching the color assigned to contact list entry 440 to the color of hardware button 420 (as indicated by the diagonal line pattern). The matching colors communicate that depressing hardware button 420 activates the speed dial function for contact list entry 440.

The user may also personalize the color scheme of any portion of display 410 or any number of hardware buttons 420, 430. For example, a user can select the color scheme associated with a sports team as the background lighting for display 410 to express team loyalty. Any corresponding hardware buttons 420, 430 may also be selectively illuminated. In another embodiment, the color scheme used for illuminating display 410 and hardware buttons 420, 430 may be selected to match a color scheme associated with a specific application.

By using a color scheme to communicate information related to the integration of software and hardware, information about an event may be easily communicated to the user. For example, the user of a mobile device may quickly identify the context of an incoming call by observing the color scheme. In one embodiment, the information communicated is related to the branding element associated with an event that occurs at the device.

Figure 5:
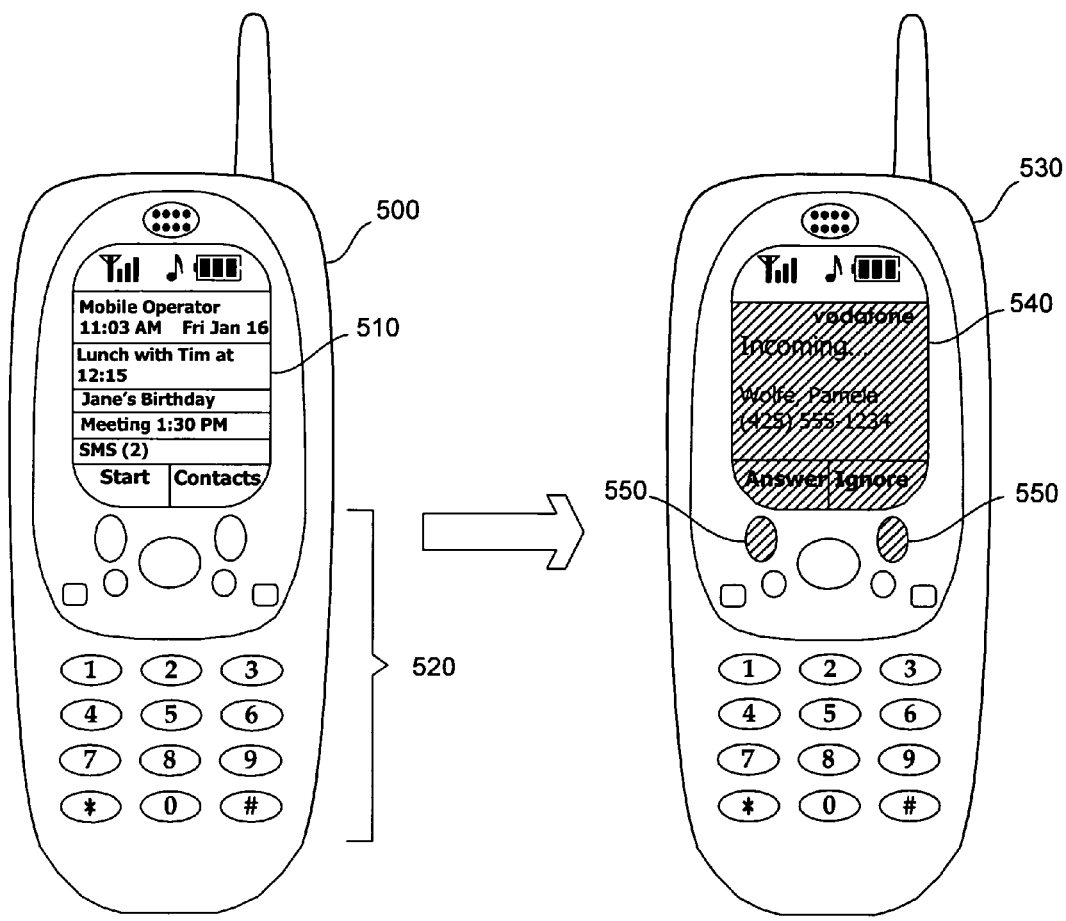
FIG. 5 illustrates an embodiment of an example mobile communication device for using a color scheme to communicate brand extension of mobile partners, in accordance with the present invention.

FIG. 5 illustrates an embodiment of an example mobile communication device for using a color scheme to communicate brand extension of mobile partners (e.g., service providers, operator equipment manufacturers). Mobile device 500 is shown as it might appear in an inactive state. A home page appears on display 510. The mobile service provider of mobile device 500 may illuminate the home page and keypad 520 in a color scheme that triggers brand association. For example, the Microsoft Corporation of Redmond, Wash. is primarily associated with the colors blue, red, green and yellow.

Mobile device 530 is shown as it might appear when a phone call is received through a different mobile operator that has a different color associated with its brand. For example, the mobile service provider, Vodaphone®, uses the color red to trigger brand identification. The Vodaphone® brand is communicated to the user of mobile device 530 by illuminating display 540 and corresponding hardware buttons 550 in red (as indicated by the diagonal line pattern). The color scheme communicates to the user which hardware elements and software functions of mobile device 530 are triggered by the incoming call. The illumination of hardware buttons 550 also cues the user as to which action is required next. For example, illuminating hardware buttons 550 notifies the user which button should be depressed to answer or ignore the incoming call.

In another example, a user may access another mobile service provider's instant messenger application. Interaction with the application causes the illumination of corresponding portions of the display and hardware keys to match the branding color scheme associated with the service provider. The color scheme communicates information to the user about which brand associated with an operator furthers the message.

Using a color scheme to communicate information associated with an event and related to the integration of hardware and software in a mobile device may be extended into other realms. For example, when a calendar reminder is received that notifies the user that a meeting is overdue, the color of the software element of the reminder may be shown in red on the user interface. A corresponding hardware button, which allows the user to dismiss the reminder, may also be illuminated in red.

In one embodiment, the information communicated by using a color scheme to illuminate corresponding hardware and software elements is related to user notification of events. The user may not wish to be informed of any notifications unless a specific event occurs. For example, the mobile device user may only want to be notified of incoming calls from a select group of callers (e.g., spouse, boss, doctor). The user may be notified of an incoming call from a caller in the select group by the illumination of hardware and software elements of the mobile device in a color scheme corresponding to the identity of the caller. If a call is received from someone that is not included in the select group, the hardware and software elements are not illuminated when the incoming call is received. Thus, the user is not required to divert attention to decide whether or not to answer the incoming call.

In another embodiment, the color scheme that communicates information associated with an event and related to the integration of hardware and software may change to indicate elapsed time. For example, a meeting reminder may change from green to yellow to orange to red as the meeting time approaches. In another example, the reception of an urgent e-mail message may cause a matching color scheme to be displayed on hardware and software elements of a mobile device. If the user does not retrieve the message within a specified time frame, the color scheme may change to communicate the urgency of the e-mail message. Alternatively, the color scheme may pulse to indicate that the user has received an urgent message that should be reviewed.

In another embodiment, using a color scheme to communicate information associated with an event and related to the integration of hardware and software may guide a user through a series of steps on the computing device by successively illuminating elements to be activated by the user. For example, the sequential illumination of soft keys and hardware buttons to be activated simplifies a user's interaction with a wizard. A wizard is a utility within an application that assists the user in performing a particular task. Wizards are commonly used in tutorial applications to guide a user through the operation of the application. Illuminating appropriate hardware and software elements guides the user to activate specific soft keys and hardware buttons such that the user may become familiar with the application. For example, after a user removes a device from its box, a soft key associated with a start function may be pulsing green to indicate that the user should depress the soft key to start the device.

The software architecture of a mobile device may include a soft key menu that indicates which soft key functions are available. However, some available actions may not be visible in the soft key menu because the user is not aware that the device is equipped to execute the function. The user may be informed of functions in the menu by using a color scheme to communicate which options are available. For example, after completing a phone call the user may have the option of saving the call and the corresponding context under which the call was received. The appropriate soft keys and hardware buttons may be illuminated with the same color scheme to remind the user that a "save call" function is available. Thus, if the user decides to save the call, she is given cues as to which hardware and software elements require activation.

Figure 6:
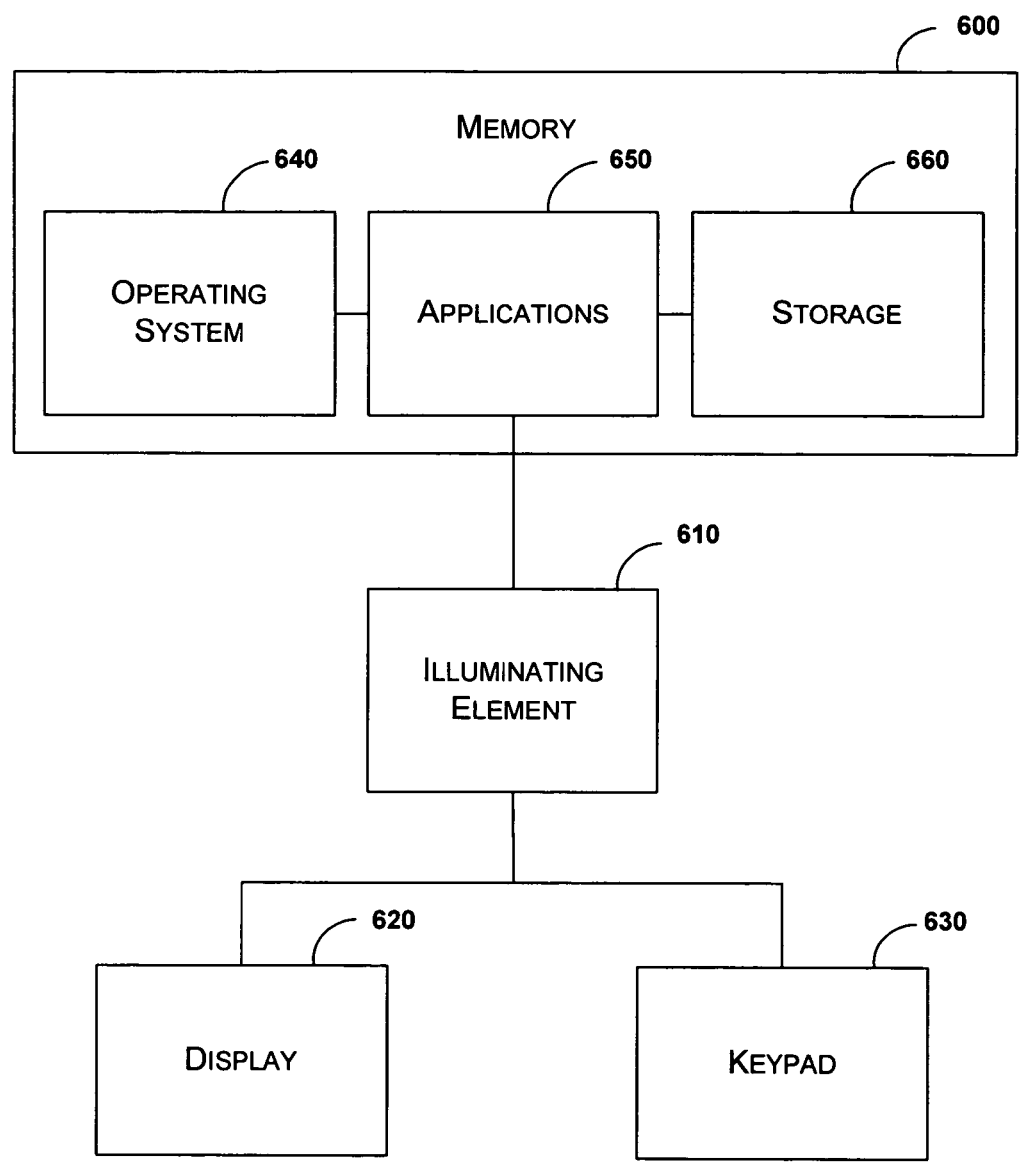
FIG. 6 illustrates an example functional block diagram of a system for using a color scheme to communicate information associated with an event and related to the integration of hardware and software, in accordance with the present invention.

FIG. 6 illustrates an example functional block diagram of a system for using a color scheme to communicate information associated with an event and related to the integration of hardware and software in a computing device, in accordance with the present invention. The system includes memory 600, illuminating element 610 (e.g., tri-colored LED, EL lighting), display 620 and keypad 630. Illuminating element 610 is coupled to memory 600, display 620 and keypad 630. Memory 600 includes operating system 640, application programs 650 and storage 660 as described in reference to FIG. 2.

A color scheme is defined to communicate specific information related to the integration of software elements of display 620 and corresponding hardware buttons on keypad 630. The color scheme is defined with a color value (e.g., an RGB value). The color value is defined in operating system 640. In one embodiment, the color value is retrieved from operating system 640 via an application program interface (API) call from application programs 650. The API calls a hardware driver to convert the color value to the correct duty cycle percentages that modulate illuminating element 610 to the same color value.

Illuminating element 610 is illuminated with the appropriate color scheme such that the color scheme of the hardware buttons of keypad 630 correspond to the software elements on display 620. For example, the color of the soft keys shown on display 620 is the same as the color of the corresponding hardware buttons on keypad 630. In one embodiment, the color scheme corresponding to the color value is directly applied to the corresponding hardware buttons by illuminating element 610. In another embodiment, the color scheme associated with the color value is applied to the corresponding hardware buttons through an acrylic or polycarbonate light pipe positioned between the hardware button and illuminating element 610.

Figure 7:
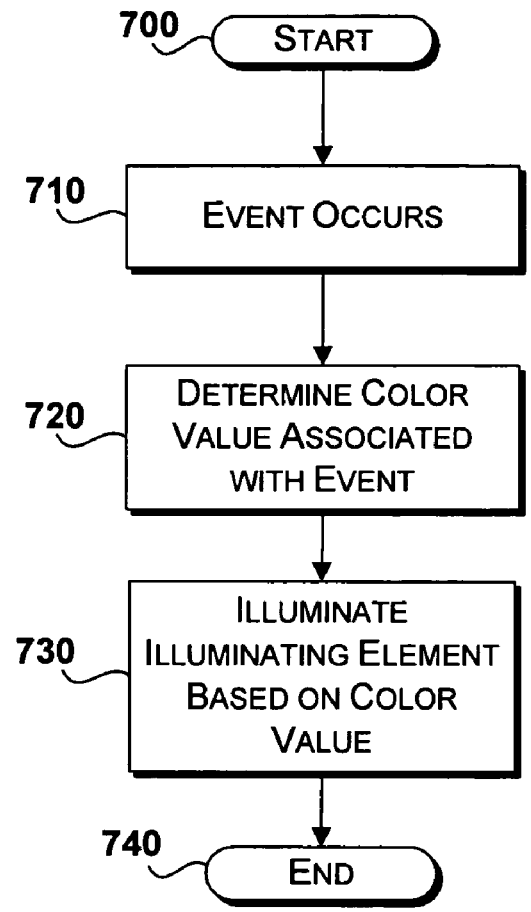
FIG. 7 is an operational flow diagram illustrating a process for using a color scheme to communicate information associated with an event and related to the integration of hardware and software, in accordance with the present invention.

FIG. 7 is an operational flow diagram illustrating a process for using a color scheme to communicate information associated with an event and related to the integration of hardware and software of a computing device. The process begins at step 700 where a color value that communicates information related to the event is defined in an operating system registry. Processing then moves to block 710.

At block 710, the event corresponding to the color value occurs at the computing device. The event may be the receipt of any notification. The notification may include an incoming call, a calendar reminder, a guide for user action, an indication of available actions, notice of availability of a new wireless network, or notice of loss of connectivity. Occurrence of an event may also be instigated by user action. For example, the user causes the occurrence of an event when the color scheme speed dial function (as described with reference to FIG. 4) is activated. Processing continues at block 720.

At block 720, the color value associated with the event is determined. In one embodiment, the color value is retrieved from the operating system via an API call. Processing proceeds to block 730.

At block 730, an illuminating element is illuminated with a color scheme based on the color value. The illuminating element illuminates the hardware element such that the color scheme associates the hardware element with a corresponding software element. In one embodiment, an API calls a hardware driver to convert the color value to the correct duty cycle percentages such that the illuminating element is modulated to the color value associated with the event.

In another embodiment, the illuminating element is an EL panel or a tri-colored LED array. For example, the EL panel or LED array may be adjusted to illuminate a panel behind the corresponding hardware button such that the hardware button is illuminated with the appropriate color scheme. The color scheme of the hardware button communicates information associated with the event and related to a feature of the corresponding software element to provide a seamless color scheme display between hardware and software elements of the mobile device. Processing ends at block 740.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for using a color scheme to communicate software application functionality associated with an incoming event notification and related to the integration of hardware and software in a computing device, comprising:

providing a first software application of an operating system associated with a first mobile partner and a second software application of a phone application associated with a second mobile partner, wherein the first and second software applications associate a function with a soft key according to an incoming event notification, wherein the function of the soft key is selectable by receiving an input from a hardware button;

associating a color scheme with the first and second software applications to indicate that the function of the soft key is associated with the hardware button, wherein the color scheme includes a first brand extension color scheme for a first mobile partner and a second brand extension color scheme for a second mobile partner;

receiving an incoming event notification that instantiates the first software application on the computing device, wherein the first software application determines software functionality options for the software key for responding to the incoming event notification;

illuminating the soft key and the hardware button on the computing device according to the first brand extension color scheme to indicate that the hardware button is associated with the soft key functionality for responding to the incoming event notification according to functionality of the operating system and to indicate that the first software application is associated with the first mobile partner;

receiving a second incoming event notification, wherein the second incoming event notification is an incoming phone call that causes an automatic instantiation of the second software application; and in response to the automatic instantiation of the second software application, automatically illuminating the soft key and the hardware button on the computing device according to the second brand extension color scheme to indicate that the hardware button is associated with the soft key functionality for responding to the incoming event notification according to functionality of the phone application and to indicate that the second software application is associated with the second mobile partner.

2. The method of claim 1, wherein illuminating the hardware button further comprises illuminating an illuminating element, wherein the illuminating element is at least one member of a group comprising: a tri-colored light emitting diode and an electro-luminescence light.

3. The method of claim 1, wherein the incoming event notification is associated with an incoming call.

4. The method of claim 1, wherein the color scheme changes to communicate information corresponding to elapsed time associated with the software application.

5. The method of claim 1, wherein the first and second brand extension schemes are associated with service providers.

6. The method of claim 1, wherein the first and second brand extension schemes are associated with operator equipment manufactures.

7. The method of claim 1, wherein the first and second brand extension schemes are associated with an application on the computing device.

8. A computer-readable storage medium having computer-executable instructions for using a color scheme to communicate software application functionality associated with an incoming event notification and related to the integration of hardware and software in a computing device, comprising:

providing a first software application of an operating system associated with a first mobile partner and a second software application of a phone application associated with a second mobile partner, wherein the first and second software applications associate a function with a soft key according to an incoming event notification, wherein the function of the soft key is selectable by receiving an input from a hardware button;

associating a color scheme with the first and second software applications to indicate that the function of the soft key is associated with the hardware button, wherein the color scheme includes a first brand extension color scheme for a first mobile partner and a second brand extension color scheme for a second mobile partner;

receiving an incoming event notification that instantiates the first software application on the computing device, wherein the first software application determines software functionality options for the software key for responding to the incoming event notification;

illuminating the soft key and the hardware button on the computing device according to the first brand extension color scheme to indicate that the hardware button is associated with the soft key functionality for responding to the incoming event notification according to functionality of the operating system and to indicate that the first software application is associated with the first mobile partner;

receiving a second incoming event notification, wherein the second incoming event notification is an incoming phone call that causes an automatic instantiation of the second software application; and in response to the automatic instantiation of the second software application, automatically illuminating the soft key and the hardware button on the computing device according to the second brand extension color scheme to indicate that the hardware button is associated with the soft key functionality for responding to the incoming event notification according to functionality of the phone application and to indicate that the second software application is associated with the second mobile partner.

9. The computer-readable storage medium of claim 8, wherein illuminating the hardware button further comprises illuminating an illuminating element, wherein the illuminating element is at least one member of a group comprising: a tri-colored light emitting diode and an electro-luminescence light.

10. The computer-readable storage medium of claim 8, wherein the incoming event notification is associated with an incoming call.

11. The computer-readable storage medium of claim 8, wherein the color scheme changes to communicate information corresponding to elapsed time associated with the software application.

12. The computer-readable storage medium of claim 8, wherein the first and second brand extension schemes are associated with service providers.

13. The computer-readable storage medium of claim 8, wherein the first and second brand extension schemes are associated with operator equipment manufactures.

14. The computer-readable storage medium of claim 8, wherein the first and second brand extension schemes are associated with an application on the computing device.

15. A system for using a color scheme to communicate software application functionality associated with an incoming event notification and related to the integration of hardware and software in a computing device, comprising:

a processor; and a memory having computer-executable instructions stored thereon, wherein the computer-executable instructions are configured to:

provide a first software application of an operating system associated with a first mobile partner and a second software application of a communication application associated with a second mobile partner, wherein the first and second software applications associate a function with a soft key according to an incoming event notification, wherein the function of the soft key is selectable by receiving an input from a hardware button;

associate a color scheme with the first and second software applications to indicate that the function of the soft key is associated with the hardware button, wherein the color scheme includes a first brand extension color scheme for a first mobile partner and a second brand extension color scheme for a second mobile partner;

receive an incoming event notification that instantiates the first software application on the computing device, wherein the first software application determines software functionality options for the software key for responding to the incoming event notification;

illuminate the soft key and the hardware button on the computing device according to the first brand extension color scheme to indicate that the hardware button is associated with the soft key functionality for responding to the incoming event notification according to functionality of the operating system and to indicate that the first software application is associated with the first mobile partner;

receiving a second incoming event notification, wherein the second incoming event notification is communication that cause an automatic instantiation of the second software application; and in response to automatically instantiation the second software application, automatically illuminate the soft key and the hardware button on the computing device according to the second brand extension color scheme to indicate that the hardware button is associated with the soft key functionality for responding to the communication notification according to functionality of the communication application and to indicate that the second software application is associated with the second mobile partner.

16. The system of claim 15, wherein illuminating the hardware button further comprises illuminating an illuminating element, wherein the illuminating element is at least one member of a group comprising: a tri-colored light emitting diode and an electro-luminescence light.

17. The system of claim 15, wherein the incoming event notification is associated with an incoming call.

18. The system of claim 15, wherein the color scheme changes to communicate information corresponding to elapsed time associated with the software application.

19. The system of claim 15, wherein the first and second brand extension schemes are associated with service providers.

20. The system of claim 15, wherein the first and second brand extension schemes are associated with operator equipment manufactures.

21. The system of claim 15, wherein the first and second brand extension schemes are associated with an application on the computing device.

* * * * *